United States Patent [19]
Bonomo et al.

[11] Patent Number: 5,980,798
[45] Date of Patent: Nov. 9, 1999

[54] METHOD FOR STEAM PRESSING COMPOSITE BOARD HAVING AT LEAST ONE FINISHED SURFACE

[75] Inventors: Brian Bonomo, Chicago; Pete Walsh, St. Charles; Kelly Seifert, Sugar Grove; Alex Vergara, St. Charles; Michelle Merrell, Naperville, all of Ill.

[73] Assignee: Masonite Corporation, Chicago, Ill.

[21] Appl. No.: 09/111,521

[22] Filed: Jul. 8, 1998

[51] Int. Cl.⁶ .................................................. B27N 3/10
[52] U.S. Cl. ........................... 264/109; 264/83; 264/102
[58] Field of Search ........................... 264/83, 101, 102, 264/109

[56] References Cited

U.S. PATENT DOCUMENTS

| | | | |
|---|---|---|---|
| 3,602,134 | 8/1971 | Carlsson . | |
| 3,649,396 | 3/1972 | Carlsson ................................. | 156/62.2 |
| 3,785,279 | 1/1974 | Fails . | |
| 3,891,738 | 6/1975 | Sherr ....................................... | 264/101 |
| 4,162,877 | 7/1979 | Nyberg ..................................... | 425/84 |
| 4,393,019 | 7/1983 | Geimer .................................... | 264/83 |
| 4,605,467 | 8/1986 | Bottger .................................... | 156/497 |
| 4,684,489 | 8/1987 | Walter ..................................... | 264/101 |
| 4,850,849 | 7/1989 | Hsu et al. ................................ | 425/407 |
| 5,078,938 | 1/1992 | Munk ....................................... | 264/109 |
| 5,158,012 | 10/1992 | Gawlitta et al. . | |
| 5,195,428 | 3/1993 | Gawlitta et al. . | |
| 5,217,665 | 6/1993 | Lim et al. ................................ | 264/83 |
| 5,246,652 | 9/1993 | Hsu et al. ................................ | 264/109 |
| 5,433,905 | 7/1995 | Tisch ........................................ | 264/83 |
| 5,629,083 | 5/1997 | Teodorczyk ........................... | 428/308.8 |

OTHER PUBLICATIONS

W. Ernest Hsu, A Practical Steam Pressing Technology for Wood Composites, Proceedings of the Washington State University\International Particleboard/Composite Materials Series Symposium; Publ by Washington State Univ., Pullman, WA, USA, pp. 69–82, Apr. 10–11, 1991.

W. Ernest Hsu, Comparison of Fiberboards Bonded with PF and UF Resins (conference abstract) S5.05–01, Wood Based Composites, http://www.metla.filconf/iufro95abs/d5pap62.htm, Oct. 8, 1995.

*Primary Examiner*—Mary Lynn Theisen
*Attorney, Agent, or Firm*—Darby & Darby

[57] ABSTRACT

In a method for making composite wood products having a market ready finished surface, a mat is formed of wood fibers treated with a binder. The mat is loaded into a press cavity formed between two press platens. The first press platen is a conventional hot press platen free of ports. The conventional platen can be smooth or patterned to emboss the finished surface on the product. The other press platen has steam injection ports. The press cavity is capable of being sealed. The mat is fully consolidated. Heat conducted from the first press platen to a first side of the mat vaporizes moisture in a portion of the thickness of the mat closest to the first side causing the moisture to greatly expand in volume. The expanded volume is vented through an opposite side of the mat to purge trapped air from the mat. The vapor expansion is vented from the mat through the steam injection ports, carrying with it trapped air and moisture. Subsequent to purging of the trapped air, the press cavity is sealed and, a quantity of steam from an external source is injected by way of the steam injection ports into the mat at a sufficient pressure and for a sufficient time to cure the binder. The quantity of steam from the external source is vented from mat through the steam injection ports before the press cavity is unsealed.

41 Claims, No Drawings

METHOD FOR STEAM PRESSING COMPOSITE BOARD HAVING AT LEAST ONE FINISHED SURFACE

FIELD OF THE INVENTION

The present invention relates generally to methods for making a composite board, such as, particleboard, fiberboard, chip board or the like, and more particularly to a method for making composite board having at least one finished surface, e.g. embossed, smooth or patterned. The board is made from a mat composed of wood particles, chips and/or fibers and a curable or hardenable binder, for example, a resin.

BACKGROUND OF THE INVENTION

Composite wood products, such as board, may be formed by consolidating a loose mat of lignocellulosic materials under heat and pressure, until the materials adhere together to form a solid wood-like product. The lignocellulosic materials may take the form of wood materials, such as, particles, chips, fibers and/or the like and it will be understood that these terms are used interchangeably herein. Although it is possible to bind lignocellulosic materials under suitable heat and consolidation conditions without additional treatments, typically, the materials forming the mat are treated with a binder, such as a resin, before heat and pressure are applied, to enhance adherence of the materials and improve the resulting properties of the finished product.

Consolidation of the mat is generally conducted in a press. A conventional press for consolidating a binder treated wood composite mat to a particular molded shape, such as, for example, a board, includes two opposing press platens spaced to define a mold cavity. Typically, at least one platen is heated through conduction, such as through the use of electric heating coils or by passing a heated fluid or gas medium, such as steam, through conduits located in the platen body.

Upon contact with the mat, heat is transferred from the platen to the mat by conduction. The press platens used in a conventional press, i.e., conventional press platens, generally have a surface for contacting the mat which is free of openings or ports. Such openings in the contact surface of a platen would cause imperfections in the surface of a finished product. Thus, conventional platens are suitable for pressing boards having a "finished" surface, e.g., a surface which does not require further mechanical working or machining in post-press operations such as sanding or planing to arrive at a market ready surface. Because post-press finishing operations such as sanding or planing are not necessary for boards produced in a conventional press, the conventional press platen may be adapted to provide a smooth "finished" surface, or an embossed or patterned "finished" surface. Subsequent to removal from the press, the board may be sold as is, or the "finished" surface of the board may be treated with a protective and/or decorative coating, such as paint or stain, to yield an enhanced market ready product.

Presses using conventional press platens have several drawbacks. Presses using conventional press platens may be unsuitable for curing certain high temperature curing resins because heat transfer from a conventional platen to the inside of a mat may be slow, thus causing temperature differentials across the thickness of the mat that are unsuitable for proper curing. For example, materials near the surface of the mat may be exposed to excessive heat, causing resin to cure too quickly and composite materials to burn, thus negatively effecting such properties as appearance and bond strength. Conversely, the inside of the mat may be exposed to insufficient heat, such that the composite material does not sufficiently consolidate and the resin does not fully cure, thus weakening the internal board strength. For the foregoing reasons, i.e., heating differentials across the thickness of a mat during consolidation and/or curing resulting in negative effects on board properties, conventional press platens are unsuitable for curing relatively thick board products.

Also, although conventional presses have been successful in making fiberboard products using only conduction heat (hot pressing), today's manufacturing demands require faster cycle times on the press and the use of stronger high-temperature resins to produce highly detailed, higher density, and, at times, thicker fiberboard products. It is known that the disadvantages of conventional platens can be overcome by supplying, or injecting, steam directly into a mat through modified press platens provided with steam injection ports for that purpose. This is generally known as "steam pressing" or "steam injection pressing". The steam passes from the injection ports into interstitial spaces between the wood particles, chips and/or fibers forming the mat, thus carrying heat quickly and uniformly to the inside of the mat. Steam injection pressing has several advantages. Steam injection pressing speeds the curing of typically dimensioned boards using conventional resins, thus significantly shortening press cycles. Steam injection pressing also permits the use of high temperature curing resins, which are not typically suitable for use in conventional pressing, and which may be cheaper, safer and/or result in a stronger bonded product. And steam injection permits consolidation and curing of relatively thick composite boards, which either do not properly cure in a conventional press or do not cure quickly enough to provide a cost competitive product. Thus, steam injection is known to speed curing of composite product, improve product quality and shorten production time for wood composite products, particularly products having thick dimensions.

The benefits and advantages of steam injection can be significantly enhanced by conducting the injection in a sealed press, i.e., a press that isolates the press cavity from the surrounding atmosphere. This can be accomplished by sealing the perimeter of the cavity. Alternatively, the entire press can be isolated in a sealed chamber. A sealed press significantly reduces or eliminates the loss of valuable steam and facilitates the injection of steam into the mat at elevated temperatures and pressures.

Steam injection pressing is generally considered unsuitable for producing a "finished" surface on board products because, as noted above, ports in a press platen typically cause imperfections in the surface of the molded product. Surface imperfections must be machined or mechanically removed, by, for example, sanding or planing, in post-pressing manufacturing steps, thus adding to the cost and complexity of manufacture. In addition to steam injection ports, steam injection platens may have channels in the mat contact surface to direct the flow of injected steam over the mat surface to various parts of the mat.

In a process referred to herein as "single-sided" steam injection, a mat is pressed between a single steam injection platen (a platen having steam injection ports) and a conventional platen free of steam injection ports. Steam injected through the single steam injection platen speeds curing of the mat and shortens press cycles. The conventional platen in a single sided steam injection process avoids undesirable imperfections in one surface of the molded product that would typically result from the steam injection ports of a steam injection platen.

Effective steam pressing of composite board products can only occur if the steam passes freely into every part of the mat to uniformly heat the mat to the saturation temperature of the steam and cure the binder. For example, in a fiberboard mat having a specific gravity of less than 0.7, intersticial spaces, i.e., spaces between the fibers, are relatively large and uniform steam penetration of the mat is relatively easily achieved. However, in a fiberboard mat having a specific gravity greater than 0.7, the relatively smaller intersticial spaces act like long, narrow channels. Subsequent to pressing the mat to this higher density, the intersticial spaces may contain air. Steam does not mix freely with the air in such narrow channels, but instead pushes the air through the channel until the air is released from an open end of the channel, or trapped in a blocked channel. Fibers and binder adjacent to the trapped air are not contacted by the steam, and consequently do not cure properly. The improper curing of some portions of the mat yields a composite product with flaws in, for example, strength and appearance.

The process of single-sided steam injection of composite board having a high specific gravity is particularly susceptable to the problem of trapped intersticial air. This is because intersticial spaces or channels are more likely to be blocked by the conventional platen which has no ports to permit escape of trapped intersticial air. Furthermore, in single-sided steam pressing, due to the use of a ported platen and a platen without ports, a cumulative effect occurs. Air in intersticial spaces in the uncured mat is pushed by a steam front moving from the steam injection platen towards the conventional platen free of steam injection ports. Simultaneously, a second steam front from moisture converted to steam by the conduction heat of the conventional platen may push trapped air towards the steam injection platen. Thus, the air is trapped in the core of the mat, generally closer to the conventional platen than the steam injection platen if the steam is injected under pressure. The air is unable to vent or escape through the conventional platen, which has no ports, and is trapped between the injection steam front and the conventional platen, or between the injection steam front and the second steam front. If the process is conducted in a sealed press, the problem is compounded by the inability of the trapped air to escape through the edges of the mat. The trapped air blocks steam from contacting and fully curing the binder. Furthermore, the trapped air may cause "blowouts" and other imperfections in the finished product. The resulting board has inferior physical properties.

U.S. Pat. No. 4,162,877, issued to D. W. Nyberg discloses a steam-injection pressing system which includes two opposing press platens defining a molding cavity into which a fibrous mat is positioned and pressed to a desired shape. Only a lower platen is a steam distribution and injection platen which includes conduits supplying injection ports to provide fluid communication between the molding cavity and both an external source of steam and a venting system, separated by controlling valves. The upper platen includes no injection or venting ports or nozzles.

In operation of the system of U.S. Pat. No. 4,162,877, after a fibrous mat is positioned within the molding cavity, steam from the steam supply is introduced through the conduits and ports of the lower platen and injected into the pressed fibrous mat located within the molding cavity. After a selected period of time, the control valves are operated to close off the supply of steam and thereafter to open the molding cavity to the venting system. The venting system uses the conduits and injection ports of the distribution and injection platen to draw steam and moisture from the molding cavity.

Since the opposing (upper) platen of U.S. Pat. No. 4,162,877 is "clean", it may be used as an embossing platen to impress detail into the pressed fibrous mat, but only if the mat has a density less than 0.7. At any higher mat density, according to the patent, a mesh must be used to help prevent air from becoming trapped adjacent to the upper platen. Unfortunately, for many embossing-press applications, the density of the fibrous mat is greater than 0.7 and any use of a wire mesh, as taught by U.S. Pat. No. 4,162,877 would preclude the use of an embossing surface plate in the opposing platen.

It is known that trapped air can be removed or vented from a mat by "flushing" steam through the mat. Steam injected into a mat is passed through the thickness of the mat and exhausted from the mat such that it pushes or carries trapped air out of the mat. Air can be "flushed", for example, through the edges of the mat. However, flushing steam out through the edges of the mat is inefficient in the production of some dimensional lumber due to the relatively small edge area relative to a large surface area of a mat in contact with press platens. Flushing steam through the edges is also not suitable in sealed press applications or in high density mats in which flow is restricted. Alternatively, steam can be injected into the mat from one injection press platen and exhausted through an opposite press platen provided with ports to establish a "cross-flow" of steam across the thickness of the mat. U.S. Pat. No. 4,684,489 for a process for making composite wood panel calls for compression without steam injection to a first compression position, subsequent steam pressing with intermittent "flushing" of steam from one injection platen to an opposite injection platen, final compression with steam injection from both platens and a vacuum step. Although this existing "cross flow" press design allows steam to heat all areas of the mat evenly and effectively, it precludes the use of an embossing platen wherein one surface of the cavity remains "clean", free of any injection nozzles, meshes, grooves, or openings, i.e., so that high detail may be embossed on the surface of the compressed mat. This process is therefore not suitable for the production of board having at least one "finished" surface.

A journal publication to Ernest W. Hsu titled *A Practical Steam Pressing Technology for Wood Composites*, Proceedings of the Washington State University International Particleboard/Composite Materials Symposium, Pullman, Washington, Apr. 10, 1991 (hereinafter "Hsu 1991"), generally discloses that steam injection is suitable for making thick board products. Hsu also teaches that "if injection is delayed, the mat for a high density panel may become too compressed for effective steam penetration, particularly if steam pressure is low."

In U.S. Pat. No. 4,393,019 to Geimer it is disclosed that by taking advantage of the natural porosity of the mat, press time can be reduced by transferring heat to the mat connectively. According to Geimer, a well known method of using convective heat transfer is the "steam shock" or "steam jet" method wherein a mat laden with surface moisture is contacted with hot platens which vaporize the moisture. The steam created moves quickly toward the center of the mat, thereby raising core temperature. Geimer goes on to discuss the introduction of steam directly into the mat (applied steam) as a separate method of heating and curing mats. Geimer also teaches that steam introduced into the mat penetrates between particles, flakes or fibers and actually creates or opens permanent paths by which heat can transfer by convection to the center of the board (col. 4, lines 1–6). Geimer '019 does not teach combining the "steam shock/jet"

step with a venting step and a steam injection step, and does not recognize the problem of trapped air.

In general, the prior art recognizes but does not fully address the problem of uncured zones caused by trapped air in a compressed mat in a process suitable for producing thick boards having at least one finished surface. Thus, there is a need for a single-sided steam injection process that can produce a thick board with suitable strength and consistency and with at least one finished surface.

SUMMARY OF THE INVENTION

The present invention is directed to a method for making composite wood products in a sealed steam press in which air is purged from a mat before any steam is injected. The mat is fully consolidated in the sealed press. Full consolidation is followed by conduction of sufficient heat to one side of the mat to turn at least some moisture in the mat to steam and create a pressure differential in the mat. The pressure differential in the mat is vented through an opposite side of the mat, such that trapped air is flushed from the mat. Then high pressure steam from an external source is injected into the mat to cure the resin.

The method is preferably practiced in a "single-sided" steam injection press, i.e., a press having a steam injection platen opposite a plain or patterned conventional platen. The method has the following steaming steps: in a sealed press cavity, conducting a quantity of heat to a portion of the thickness of a mat adjacent to a first side of the mat, the quantity of heat sufficient to convert moisture in that portion of the thickness of the mat to steam, venting the steam through a second side of the mat to eliminate interstitial air from the mat, and injecting high pressure steam into the mat through the second side of the mat to cure the resin.

DETAILED DESCRIPTION

In accordance with the present method, preferably, wood fiber is prepared by conventional methods for forming a mat. Also by conventional methods, the wood fiber is treated and formed into a mat such that the content-by-weight of the resulting sealed pressed board is as follows: wood fiber having 5–15% moisture content; 4–8% phenolic resin binder; 1–4%wax; and 0.5–1.0% zinc borate. It will be understood that the content by weight is essentially the same before and after pressing based on the total dry weight of the board. The moisture content of the mat before pressing is approximately 7–12% and the moisture content of the pressed board product is about 4–8%. The wax provides water repellent properties to the sealed pressed product. The zinc borate acts as a fungicide, and the aluminum chloride enhances the machinability of the sealed press product. Other known additives or treatments may be provided to the wood fibers as desired. As noted above, the method will also work well with a mat made from other lignocellulosic materials such as, for example, wood chips or particles.

The preferred binder is a phenolic resin that is slow curing and has an alkalinity less than 2.5% and a pH less than 10. The boiling water gel time of the preferred resin should be greater than 20 minutes and preferably in the range of 20–60 minutes. (The boiling water gel time is determined by a standard resin test used to establish relative cure rates of various resin types or various resin formulations by measuring the resin cure rate at 212° F.) The binder is added to the wood fibers, and the mixture is formed into a fibrous mat which is fully compressed between the platens of the press. Other binders such as, for example, thermosetting resins such as urea-formaldehyde, phenol-formaldehyde, resorcinol-formaldehyde, condensed furfuryl alcohol resins or organic polyioscyanates, are suitable for use in the process. The binder adheres the wood fibers together to give a compressed fibrous mat structural integrity and hold it in the desired molded shape.

It was previously thought that single-sided steam injection could not be conducted on a highly densified mat, particularly a mat having a thick cross-sectional dimension, due to problems associated with steam penetration, trapped air and resin blowout. Consolidation was thought to prevent effective steam penetration. Increasing the pressure of the injected steam to facilitate steam penetration leads to a steam front moving from the steam injection platen towards the conventional platen. Interstitial air between the resin coated particles is pushed ahead of the advancing steam front. Unable to escape through the conventional platen, the air is trapped in the mat. The trapped air blocks steam from contacting binder in portions of the mat, thus preventing proper curing of those mat portions. The improperly cured mat portions yield weaknesses, blemishes and imperfections in the finished product. In addition, upon opening the press cavity, the sudden release of pressure build-up in the consolidated and cured product can cause similar defects, e.g., blemishes, weaknesses or imperfections in the finished product. Furthermore, high pressure steam injection is thought to cause resin blowout, i.e., the undesired removal of resin from wood particles or fibers by the force of steam injection, usually in portions of the mat closest to the injection ports. Resin blowout also causes imperfections and weaknesses in the finished product.

It has been discovered that the present method solves the problem of trapped air while avoiding resin blowout. Heat conducted to a first side of the mat vaporizes moisture in a portion of the thickness of the mat closest to the first side causing the volume of the moisture, now in the form of steam, to greatly expand. Initially the press cavity may be sealed, i.e. the ports on the steam injection platen are closed, so that an increased pressure builds inside the mat. The increased pressure is subsequently released by opening the steam injection ports. Alternatively, the mat is unsealed, i.e., the ports on the steam injection platen are open, during the vaporizing step to allow the expanded volume to escape. In either case, venting the steam generated in the mat through an opposite side of the mat purges trapped air from the mat. Resin blowout is prevented by fully consolidating the mat and keeping the press closed before any steam injection is applied. Resin blowout is further prevented by thoroughly venting pressure from the consolidated mat, preferably through the steam injection ports, prior to opening the press cavity to release the finished product. The prevention of resin blowout and elimination of trapped air permits the application of high pressure steam which thoroughly penetrates the mat to cure the binder. High pressure steam in turn permits the rapid curing of binders having a slow curing time and/or high curing temperature, such as, for example phenolic resins. Phenolic resins applied in smaller quantities provide cured properties comparable to other known resins, and thus are more economical to use. Phenolic resins are considered safer than other resins. Thus, the resulting finished board exhibits improved board properties and is produced in a cheaper, safer manner in a press time comparable to known methods.

After the mat has been treated and formed, it is loaded into the press. A single-sided steam press that may be used to compress the mat and binder to a particular molded shape includes two platens with opposing surfaces that respectively define the top and bottom of a molding cavity. The molding cavity is also referred to herein as a press cavity. One of the press platens is a conventional hot press platen with a "clean" pressing surface free of injection or venting ports. The "clean" pressing surface of the conventional platen faces a ported pressing surface of a steam injection platen. A stop frame is attached along the perimeter of the conventional platen. The edges of the press cavity are thus defined by the stop frame. When the press is closed, an O-ring seals the stop frame to the perimeter of the steam injection platen to form a sealed press cavity. The stop frame may serve several functions including, establishing the platen-to-platen thickness of the press cavity, minimizing loss of steam at the mat edges, and otherwise stabilizing the mat during pressing.

The conventional platen, because it has a surface free of ports, is suitable for pressing a "finished" surface onto one side of the consolidated mat. As noted above, the finished surface of the consolidated board may be smooth, or may be embossed with a highly detailed pattern. The steam injection platen has a plurality of steam injection ports in the pressing surface which are supplied by steam distribution conduits in the body of the platen. The plurality of steam injection ports and the conduits provide fluid communication between the molding cavity and both an external source of steam and a venting system to the atmosphere, separated by controlling valves. The platen is thus adapted, by manipulating the controlling valves, to inject steam into the mat through the steam injection ports, and vent steam, excess moisture and air from the mat through the same steam injection ports. Between steam injection and steam venting operations, the control valves are manipulated such that the steam injection ports are closed, i.e., no fluid or gas passes in or out of the ports, thus maintaining a sealed press cavity.

Alternatively, steam injection ports connected to a steam supply, and venting ports connected to a venting system may be provided in the pressing surface of the steam injection platen, so that the injection and venting operations are isolated from each other and can be controlled separately. In this alternative arrangement, the only communication between the steam supply system and the venting system is through the mat in the press cavity.

During the steam injection process, each platen must be capable of being heated, for example, by electric heating coils or by passing steam through appropriate conduits located in the platen body, to a temperature greater than or equal to the temperature of the injected steam. By maintaining the temperature of the platens at or above that of the injected steam, condensation of the injected steam inside the mat is avoided and excess moisture in the mat is converted to steam.

With the mat loaded and positioned between the press platens, and the steam injection ports closed, the press is closed and the mat is fully consolidated by moving at least one of the two press platens toward the other of the press platens to a final consolidation position. The thickness of the fully consolidated mat is substantially the same thickness as the thickness of the final product. For example, a siding board product may have a thickness of approximately one half inch, while a trim board product may have a thickness of 1 inch or greater. The fully consolidated mat, i.e., the composite board, has a density in the range of 0.65 to 0.85 grams/cubic centimeter. The preferred density of the consolidated mat is 0.80 for half inch board and 0.70 for one inch board.

After the mat is fully consolidated in the press cavity, heat is conducted from the conventional platen to the side of the mat in contact with the conventional platen. The heat is conducted at a sufficient temperature and for a sufficient period of time to convert moisture to steam in a portion of the thickness of the mat adjacent to the platen. For example, for pressing a board having the content-by-weight described above, the conventional platen can be heated to a temperature in the range of 380–420° F., preferably 400° F. Heat is conducted from the platen for a period of 90–240 seconds in order to convert sufficient moisture in the mat into the "internal" steam necessary for the subsequent step of purging air from the mat. The "internal" steam created by conduction moves through the intersticial spaces in the mat, transferring heat deeper into the mat by convection and converting more moisture to steam. In essence, the conducted heat generates a steam front in the portion of the thickness of the mat adjacent to the conventional platen. The internally generated steam front moves from the conventional platen towards the steam injection platen.

As the conducted and convected heat converts moisture to steam, the volume of the moisture, i.e., the steam, greatly expands. The greatly expanded volume of the steam displaces air in the mat. If the steam injection ports are left open at this stage, the displaced air will flow out of the mat and into the distribution conduits of the steam injection platen. Alternatively, if the press cavity is sealed, i.e., steam injection ports are closed, the steam created by conduction causes an increase in pressure inside of the mat relative to the pressure outside the press cavity. When the control valves are manipulated to open the steam injection ports to communication with the steam venting system, which is preferably near atmospheric pressure, the internally generated steam contained at an increased pressure in the mat exhausts through the ports, pushing excess moisture and air out ahead of it. The steam injection ports are maintained at near atmospheric pressure until the mat is purged of air. In either case, after the air trapped in the mat has been purged, the control valves are manipulated to switch the ports from the venting function to the steam injection function to facilitate the delivery of steam from an external source into the mat at an increased pressure.

Steam from an external source is injected through the ports into the mat at a temperature and a pressure sufficient to cure the binder and solidify the mat. The steam injection is preferably at an elevated or "high" pressure. In the present context, "high" pressure is 100 psi or greater. For the product content-by-weight described above, steam at a temperature of approximately 330–400° F. was injected at 200 psi for 90 seconds, but may be injected in a range of from 100 to 250 psi for 30 to 120 seconds. When sufficient high pressure steam has been injected to attain the desired degree of cure of the binder, steam injection is halted.

The steam injection ports are again switched to the venting function, and pressure in the mat is exhausted before the press cavity is opened. The press cavity is opened after venting sufficient to prevent flaws in the product which could otherwise result from a sudden release of pressure from within the mat. The molded, cured fiberboard product is removed.

Examples of the improvement in properties that can achieved by purging air from a mat prior to curing the binder with high pressure steam injection are summarized in Table 1 below. The table compares properties of half inch thick board samples prepared in a sealed press with properties of a conventionally pressed product and the American Hardboard Association standards. In a method similar to that of the present invention, excess air was purged from the mat before a final steam injection to cure the binder.

TABLE 1

|  | Sealed pressing | Conventional pressing | American Hardboard Association |
| --- | --- | --- | --- |
| one hour boil swell | <15% | <30% | none |
| 24 hour water absorption | <10% | 10% | 12% |
| 24 hour caliper swell | <5% | <5% | <8 |
| specific gravity (g/cc) | 80 | 90 |  |
| press time (minutes) | 3 | 6 |  |
| humidification required | no | yes |  |
| rot resistance | yes | no |  |
| MOR psi | 5000 | 5000 | >1800 |
| MOE psi | 250 | 250 |  |

Sample half inch thick boards made according to the present invention exhibited significantly improved (lower) "one hour boil swell" and rot resistance, lower specific gravity (density), the reduction or elimination of post press humidification, and significantly shorter press time. In addition, the properties of the product samples were well within the standards established by the American Hardboard Association.

The "one hour boil swell" is a comparative measurement used by the inventors to determine the relative durability of a composite board product by calculating the percentage of change in the thickness of the board after submerging a 1 inch by 12 inch sample of the board in boiling water for one hour. After removal from the boiling water, the thickness of the board sample is measured and compared to the thickness of the board sample prior to boiling. The difference between the measurements is used to calculate a percentage of change.

The reduction or elimination of post-press humidification is an important advantage of the present invention over conventional pressing. Fluctuations in the moisture content of a composite board product after manufacture are known to cause undesirable dimensional changes, such as, for example, linear expansion or buckling of the product. During typical end use exposures, products pick up and lose moisture based on environmental factors, such as, for example, humidity, rain, drought, etc. To avoid undesirable dimensional changes in an end use exposure, typically, composite board products are humidified after conventional methods of pressing to increase the average moisture content of the product to a level suitable for a particular geographic or climatic area in order to minimize moisture content fluctuation. Post-press humidification adds moisture content to composite board products. Post-press humidification is particularly important for products produced in conventional hot platen pressing, which have substantially all of the moisture "cooked out" during pressing, and thus exit the press with nearly 0% moisture.

The ideal moisture content of composite wood products should typically be 7% (with a range of 2%) in environmentally dry areas and 12% or more in environmentally wet areas. As noted above, boards produced according to the present invention have a moisture content of 4–8%. Thus, boards produced according to the present invention are particularly suitable for interior or exterior applications in a variety of climates with little or no post-press humidification. Applications contemplated for the board products include, but are not limited to, trimboard, fencing, siding, decking, window and door components, case good substrate for the furniture industry, pallets and containers, interior molding and millwork, ornamental products such as gazebos, shutters, and wall paneling and wall systems. It will be understood that numerous other applications, though not specifically mentioned, are also contemplated.

Although preferred embodiments of the invention have been disclosed for illustrative purposes, those skilled in the art will appreciate that many additions, modifications and substitutions are possible without departing from the scope and spirit of the invention as defined by the accompanying claims.

What is claimed is:

1. A method for making a composite wood product, comprising the steps of:

forming a mat comprising wood particles treated with uncured binder, the mat having opposite first and second sides, a moisture content and an excess air content;

consolidating the mat to a thickness;

supplying a first quantity of heat by conduction to the first side of the mat, the quantity of heat sufficient to convert at least a portion of the moisture content in the thickness of the mat to a quantity of internally generated steam;

venting at least a portion of the quantity of internally generated steam from the mat through the second side such that the excess air content is purged from the mat; and supplying a second quantity of heat to the mat sufficient to cure the binder throughout the entire thickness.

2. The method of making a composite wood product according to claim 1 wherein the mat is consolidated in a press cavity and the press cavity is sealed after the excess air content is purged from the mat.

3. The method of making a composite wood product according to claim 2 wherein after the binder is cured throughout the thickness, the mat is vented before the press cavity is opened.

4. The method of making a composite wood product according to claim 1 wherein the first quantity of heat is supplied to the portion of the thickness of the mat adjacent to the first side by conduction from a heated press platen.

5. The method of making a composite wood product according to claim 1 wherein the second quantity of heat sufficient to cure the binder is supplied by providing a quantity of steam to the mat from an external source.

6. The method of making a composite wood product according to claim 4 wherein the second quantity of heat sufficient to cure the binder is supplied by providing a quantity of steam to the mat from an external source.

7. The method of making a composite wood product according to claim 5 wherein the quantity of steam from an external source is provided through steam injection ports in a steam injection platen.

8. The method of making a composite wood product according to claim 6 wherein the quantity of steam from an external source is provided through steam injection ports in a steam injection platen.

9. The method of making a composite wood product according to claim 5 wherein the quantity of steam from an external source is provided through the second side of the mat.

10. The method of making a composite wood product according to claim 6 wherein the quantity of steam from an external source is provided through the second side of the mat.

11. The method of making a composite wood product according to claim 5 wherein the quantity of steam from an external source is provided at a temperature of 330–400° F., a pressure of 100 psi or greater and for a period of 30–120 seconds.

12. The method of making a composite wood product according to claim 6 wherein the quantity of steam from an external source is provided at a temperature of 330–400° F., a pressure of 100 psi or greater and for a period of 30–120 seconds.

13. The method of making a composite wood product according to claim 9 wherein the quantity of steam from an external source is provided at a temperature of 330–400° F., a pressure of 100 psi or greater and for a period of 30–120 seconds.

14. The method of making a composite wood product according to claim 10 wherein the quantity of steam from an external source is provided at a temperature of 330–400° F., a pressure of 100 psi or greater and for a period of 30–120 seconds.

15. A method for making a composite wood product, comprising the steps of:
    forming a mat comprising wood particles treated with uncured binder, the mat having opposite first and second sides, a moisture content and an excess air content;
    consolidating the mat to a final thickness;
    supplying a first quantity of heat by conduction to the first side of the mat, the first quantity of heat sufficient to convert at least a portion of the moisture content in the thickness of the mat to steam;
    venting the mat through the second side of the mat such that the excess air content is purged from the mat; and
    heating the mat at a temperature and pressure sufficient to cure the binder throughout the thickness of the mat.

16. The method of making a composite wood product according to claim 15 wherein the mat is consolidated in a press cavity and the press cavity is sealed after the excess air content is purged from the mat.

17. The method of making a composite wood product according to claim 16 wherein after the binder is cured throughout the thickness, the mat is vented before the press cavity is opened.

18. The method of making a composite wood product according to claim 15 wherein the first quantity of heat is supplied to the first side of the mat by conduction from a heated press platen.

19. The method of making a composite wood product according to claim 15 wherein the second quantity of heat sufficient to cure the binder is supplied by providing a quantity of steam to the mat from an external source.

20. The method of making a composite wood product according to claim 18 wherein the second quantity of heat sufficient to cure the binder is supplied by providing a quantity of steam to the mat from an external source.

21. The method of making a composite wood product according to claim 19 wherein the quantity of steam from an external source is provided through steam injection ports in a steam injection platen.

22. The method of making a composite wood product according to claim 20 wherein the quantity of steam from an external source is provided through steam injection ports in a steam injection platen.

23. The method of making a composite wood product according to claim 19 wherein the quantity of steam from an external source is provided through the second side of the mat.

24. The method of making a composite wood product according to claim 20 wherein the quantity of steam from an external source is provided through the second side of the mat.

25. The method of making a composite wood product according to claim 19 wherein the quantity of steam from an external source is provided at a temperature of 330–400° F., a pressure of 100 psi or greater and for a period of 30–120 seconds.

26. The method of making a composite wood product according to claim 20 wherein the quantity of steam from an external source is provided at a temperature of 330–400° F., a pressure of 100 psi or greater and for a period of 30–120 seconds.

27. The method of making a composite wood product according to claim 23 wherein the quantity of steam from an external source is provided at a temperature of 330–400° F., a pressure of 100 psi or greater and for a period of 30–120 seconds.

28. The method of making a composite wood product according to claim 24 wherein the quantity of steam from an external source is provided at a temperature of 330–400° F., a pressure of 100 psi or greater and for a period of 30–120 seconds.

29. A method for making a composite wood product, comprising the steps of:
    forming a mat comprising wood particles treated with uncured binder, the mat having a moisture content and an excess air content;
    placing said mat in a press cavity defined between a first press platen and a second press platen, the first press platen adapted to vent the mat;
    moving at least one of the first and second press platens toward the other of the first and second press platens to consolidate the mat;
    supplying a first quantity of heat to the mat by conduction from the second press platen, the quantity of heat sufficient to convert at least a portion of the moisture content of the mat to steam;
    venting the mat through the first press platen such that the excess air content is purged from the mat; and
    supplying a second quantity of heat to the mat through the first press platen, the second quantity of heat supplied at a temperature and for a period of time sufficient to cure the binder.

30. The method of making a composite wood product according to claim 29 wherein the press cavity is sealed after the excess air content is purged from the mat.

31. The method of making a composite wood product according to claim 30 further comprising the step of, after the binder is cured throughout the thickness, venting the mat through the first press platen before the press cavity is opened.

32. The method of making a composite wood product according to claim 29 wherein the first press platen has at least one port to supply steam from an external source to the mat and to vent the mat.

33. The method of making a composite wood product according to claim 29 wherein the second quantity of heat sufficient to cure the binder is supplied by providing a quantity of steam to the mat from an external source.

34. The method of making a composite wood product according to claim 33 wherein the first press platen has at least one steam injection port, and the quantity of steam from an external source is provided to the mat through the at least one steam injection port in the first platen.

35. The method of making a composite wood product according to claim 33 wherein the first press platen has a plurality of steam injection ports and the quantity of steam from an external source is provided to the mat through the plurality of steam injection ports.

36. The method of making a composite wood product according to claim 33 wherein the at least one steam injection port is adapted to selectively vent the mat.

37. The method of making a composite wood product according to claim 35 wherein the plurality of steam injection ports are adapted to selectively vent the mat.

38. The method of making a composite wood product according to claim 33 wherein the quantity of steam from an external source is provided at a temperature of 330–400° F., a pressure of 100 psi or greater and for a period of 30–120 seconds.

39. The method of making a composite wood product according to claim 34 wherein the quantity of steam from an external source is provided at a temperature of 330–400° F., a pressure of 100 psi or greater and for a period of 30–120 seconds.

40. The method of making a composite wood product according to claim 35 wherein the quantity of steam from an external source is provided at a temperature of 330–400° F., a pressure of 100 psi or greater and for a period of 30–120 seconds.

41. The method of making a composite wood product according to claim 36 wherein the quantity of steam from an external source is provided at a temperature of 330–400° F., a pressure of 100 psi or greater and for a period of 30–120 seconds.

* * * * *